US012255407B2

(12) United States Patent
Adams et al.

(10) Patent No.: US 12,255,407 B2
(45) Date of Patent: Mar. 18, 2025

(54) LOW COST ELECTRONICALLY SCANNING ANTENNA ARRAY ARCHITECTURE

(71) Applicant: The Boeing Company, Chicago, IL (US)

(72) Inventors: Alec Adams, Seattle, WA (US); Mark Gregory Bedson, Federal Way, WA (US); Lixin Cai, Ravensdale, WA (US); Ming Chen, Bellevue, WA (US); Peter Timothy Heisen, Kent, WA (US); Korey Martin Holmstrom, Kent, WA (US)

(73) Assignee: The Boeing Company, Arlington, VA (US)

( * ) Notice: Subject to any disclaimer, the term of this patent is extended or adjusted under 35 U.S.C. 154(b) by 449 days.

(21) Appl. No.: 17/588,172

(22) Filed: Jan. 28, 2022

(65) Prior Publication Data

US 2023/0106696 A1 Apr. 6, 2023

Related U.S. Application Data

(60) Provisional application No. 63/251,582, filed on Oct. 1, 2021.

(51) Int. Cl.
*H01Q 3/28* (2006.01)
*H01Q 3/34* (2006.01)

(52) U.S. Cl.
CPC ................. *H01Q 3/28* (2013.01); *H01Q 3/34* (2013.01)

(58) Field of Classification Search
CPC .................................. H01Q 3/28; H01Q 3/24
See application file for complete search history.

(56) References Cited

U.S. PATENT DOCUMENTS

| | | | |
|---|---|---|---|
| 5,055,852 | A | 10/1991 | Dusseux et al. |
| 6,281,857 | B1 | 8/2001 | Dobrovolny |
| 6,369,759 | B1 | 4/2002 | Epp et al. |
| 8,350,771 | B1 | 1/2013 | Zaghloul et al. |
| 8,368,596 | B2 | 2/2013 | Tiezzi et al. |
| 8,773,323 | B1 | 7/2014 | Manry, Jr et al. |
| 9,742,058 | B1 | 8/2017 | O'Neill, Jr. et al. |

(Continued)

FOREIGN PATENT DOCUMENTS

RU 2603530 C2 11/2016

OTHER PUBLICATIONS

Extended European Search Report, Application No. 22196907.4, Dated Feb. 20, 2023.

(Continued)

*Primary Examiner* — Graham P Smith
(74) *Attorney, Agent, or Firm* — Harrity & Harrity, LLP

(57) ABSTRACT

Antenna elements include a metallic square ring patch and a metallic square ring slot to transmit or receive radio frequency (RF) signals. The antenna elements use several dielectric layers that are separated by a low-dielectric foam layer upon which the square ring patch is positioned. The disclosed antenna elements may be arranged together in an antenna array that is tunable to collectively generate or receive RF signals. In particular, the antenna array functions as a 256-element transmit/receive half-duplex antenna, operating in transmit or receive mode for half the time. The antenna array includes a radiator block, a transmit/receiver (T/R) amplifier block, a beamformer block, and a distribution network block.

18 Claims, 12 Drawing Sheets

(56) References Cited

U.S. PATENT DOCUMENTS

| | | | |
|---|---|---|---|
| 9,819,088 | B2 | 11/2017 | Lai et al. |
| 10,665,934 | B2 | 5/2020 | Hashimoto |
| 2004/0217907 | A1 | 11/2004 | Inoue |
| 2005/0190106 | A1 | 9/2005 | Anguera Pros et al. |
| 2008/0266178 | A1 | 10/2008 | Tiezzi et al. |
| 2010/0126010 | A1 | 5/2010 | Puzella et al. |
| 2014/0145891 | A1 | 5/2014 | Palevsky et al. |
| 2015/0084814 | A1 | 3/2015 | Rojanski et al. |
| 2015/0303576 | A1 | 10/2015 | Latrach et al. |
| 2018/0191073 | A1 | 7/2018 | Celik |
| 2019/0089070 | A1* | 3/2019 | Zihir .................... H01Q 21/205 |
| 2020/0021026 | A1 | 1/2020 | Mitchell et al. |
| 2020/0076083 | A1 | 3/2020 | Fukunaga et al. |
| 2020/0335869 | A1 | 10/2020 | Jia |
| 2020/0381842 | A1 | 12/2020 | Milroy et al. |
| 2022/0077583 | A1 | 3/2022 | Jian et al. |

OTHER PUBLICATIONS

Caso, R., et al., "A novel dual-feed slotcoupling feeding technique for circularly polarized patch arrays," IEEE Antennas and Wireless Propagation Letters, vol. 9, 2010, pp. 183-186.

Caso, R., et al., "An annular-slot coupling feeding technique for dual-feed circularly polarized patch arrays," IEEE AP-S International Symposium, Toronto, Ontario, 2010.

Mailloux, R.J., "On the use of metallized cavities in printed slot arrays with dielectric substrates," IEEE Transactions on Antennas and Propagation, May 1987, pp. 477-487.

Pozar, D., "A review of aperture coupled microstrip antennas: history operation development and applications", University of Massachusetts at Amherst, May 1996.

Row, J-S., Design of Aperture-Coupled Annular-Ring Microstrip Antennas for Circular Polarization, IEEE Transactions on Antennas and Propagation, vol. 53, No. 5, May 2005, pp. 1779-1784.

* cited by examiner

LOW COST ELECTRONICALLY SCANNING ANTENNA ARRAY ARCHITECTURE

CROSS-REFERENCE TO RELATED APPLICATIONS

This application claims priority to U.S. Provisional Application Ser. No. 63/251,582 entitled "LOW COST ELECTRONICALLY SCANNING ANTENNA ARRAY ARCHITECTURE" and filed on Oct. 1, 2021, which is incorporated herein by reference in its entirety.

BACKGROUND

A phased array antenna ("PAA") is a type of antenna that includes a plurality of sub-antennas (generally known as antenna elements, array elements, or radiating elements of the combined antenna) in which the relative amplitudes and phases of the respective signals feeding the array elements may be varied in a way that the effect on the total radiation pattern of the PAA is reinforced in desired directions and suppressed in undesired directions. In other words, a beam may be generated that may be pointed in or steered into different directions. Beam pointing in a transmit or receive PAA is achieved by controlling the amplitude and phase of the transmitted or received signal from each antenna element in the PAA.

The individual radiated signals are combined to form the constructive and destructive interference patterns produced by the PAA that result in one or more antenna beams. The PAA may then be used to point the beam, or beams, rapidly in azimuth and elevation.

SUMMARY

The disclosed examples are described in detail below with reference to the accompanying drawing figures listed below. The following summary is provided to illustrate examples or implementations disclosed herein. It is not meant, however, to limit all examples to any particular configuration or sequence of operations.

The disclosed examples and implementations are directed to antenna elements that may be positioned together to form an antenna array (or PAA). The disclosed antenna elements use a number of stacked dielectric layers, at least two of which are separated by a low-dielectric foam layer. A horizontal top dielectric layer supports a microstrip square ring patch radiator and also serves as an environmental shield against corrosion. A square ring patch cutout hole reduces the resonance frequency of the patch and allows a smaller outside diameter which is desirable for mutual coupling reduction and avoidance of over-emphasis of broadside antenna gain.

The disclosed antenna elements may be arranged together in an antenna array that is tunable to collectively generate or receive RF signals. In particular, the antenna array functions as a 256-element transmit/receive half-duplex antenna, operating in transmit or receive mode at any time, but not at the same time. The antenna array includes a radiator block, a transmit/receive (T/R) amplifier block, a beamformer block, and a distribution network block.

Other technical features may be readily apparent to one skilled in the art from the following figures, descriptions, and claims.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Corresponding reference characters indicate corresponding parts throughout the accompanying drawings.

DETAILED DESCRIPTION

Figure 1:
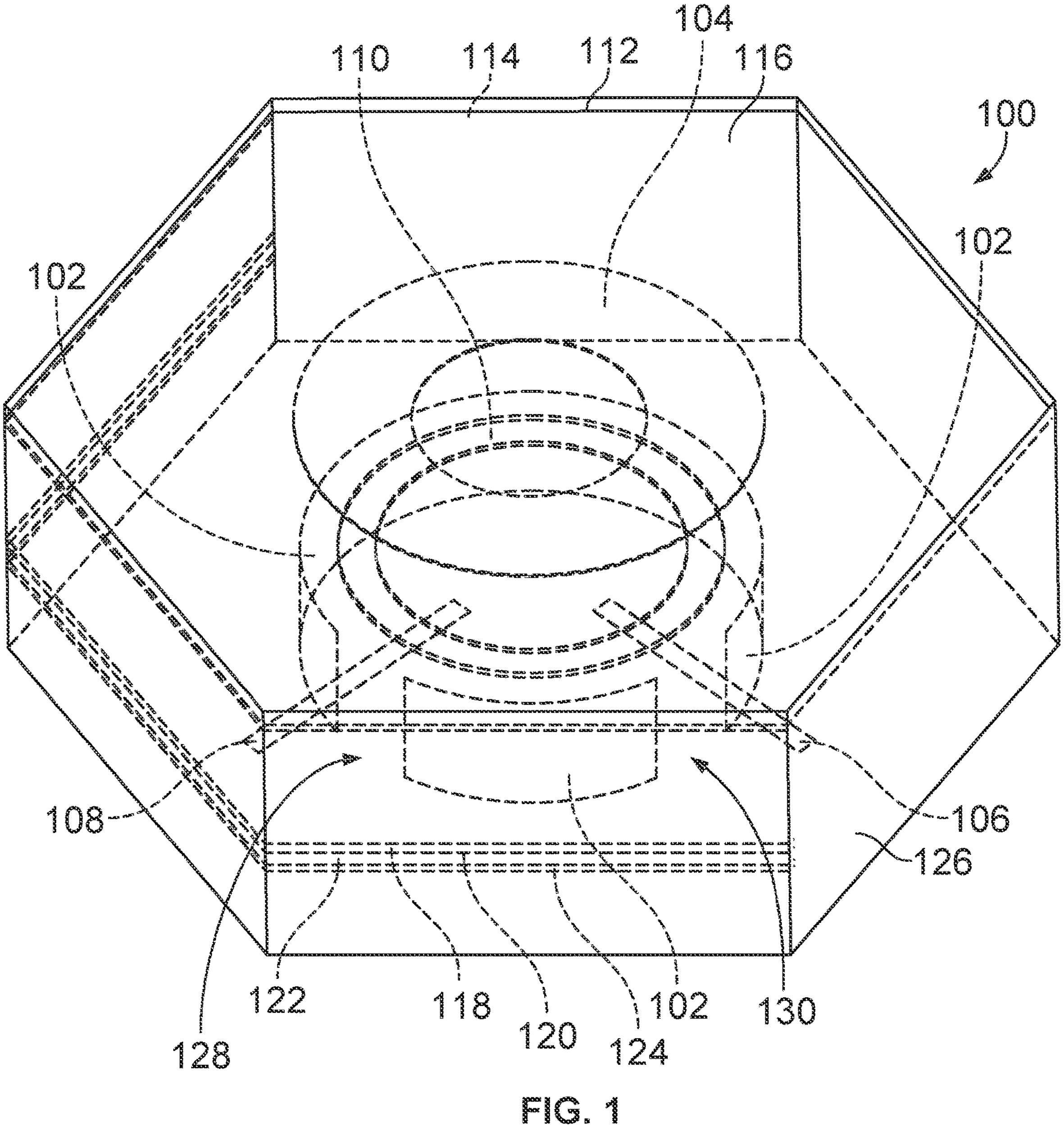
FIG. 1 illustrates a perspective view of a ring cell with an electrically conductive fence, according to some of the disclosed implementations.

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all implementations.

A phased array antenna (PAA) includes multiple emitters and is used for beamforming in high-frequency RF applications, such as in radar, 5G, or myriad other application. The number of emitters in a PAA can range from a few into the thousands. The goal in using a PAA is to control the direction of an emitted beam by exploiting constructive interference between two or more radiated signals. This is known as "beamforming" in the antenna community.

More specifically, a PAA enables beamforming by adjusting the phase difference between the driving signal sent to each emitter in the array. This allows the radiation pattern to be controlled and directed to a target without requiring any physical movement of the antenna. This means that beamforming along a specific direction is an interference effect between quasi-omnidirectional emitters (e.g., dipole antennas).

The disclosed implementations and examples provide a low-cost Ku-Band electronically-scanning antenna array architecture integrating one or more low-complexity apertures, coupled hybrid patch radiators, and commercial monolithic microwave integrated circuits (MMICs) with a low-cost multilayer printed wiring board design known as an antenna integrated printed wired assembly (AIPWA). More specifically, a ring-shaped antenna element (referred to herein as a "ring cell") is described that provides an ultra-low-cost unit cell antenna element with unique feed structure for an electronically scanning array. The ring element circuit board-like sections and low-dielectric spacers, such as a foam or core structure. A top section of the antenna element includes a layer of dielectric substrate to support a microstrip ring patch radiator. A bottom section has one layer of dielectric substrates to support a ring slot and dual feed lines. The disclosed antenna elements provide high-quality antenna performance over wide frequency bandwidth and up to +/−45 deg 1D scan range as well as dual-linear polarizations and circular polarization.

The ring cells include a unique feed structure for a PAA or other electronically scanning array. The ring cell is composed of circuit board-based sections and a foam spacer. The top section has one layer of dielectric substrate to support a microstrip ring patch radiator. The bottom section has two layers of dielectric substrates to support a ring slot, dual feed lines, and a metallic fence. The disclosed ring cells offer high-quality antenna performance over wide frequency bandwidth and large scan volume. The ring cells also provide dual-linear polarizations or circular polarizations. The disclosed ring cell does not use mechanically moving parts, eliminating much of the complexity and failure points of conventional antenna cells.

The disclosed ring cells may be arranged in an array antenna (e.g., a PAA) that includes multiple ring cells that collectively function as an electronically scanning antenna array beam. Array antennas using the disclosed ring cells may be used in a multitude of real-world applications. For example, airplanes, motorized vehicles, various military systems, Internet of Things (IoT) devices, and any devices that use RF signaling may be equipped with array antennas that use the disclosed ring cells. The disclosed ring cells and antenna arrays provide electronically scanning antenna systems that dramatically reduce both integration costs due to the low-profile design and the use of affordable off-the-shelf materials.

Traditionally, ceramic chip carrier modules are used to interface MMICs with an AIPWB. Such ceramic packages are relatively expensive and require costly manual labor to assemble. Not only that, but the ceramic packages also use bulky and complex waveguide radiators that add lamination steps and extra layers to the AIPWB. The waveguide radiators require a costly and complex wide angle impedance matching (WAIM) structure as an interface between the antenna array and free space. Unfortunately, this does not meet the cost per element targets for many line-of-sight communication customers.

The disclosed implementations and examples use low-complexity aperture coupled patch radiators, low cost commercial-off-the-shelf surface mount MMICs, and a low cost multilayer printed wiring board stack-up. The low-complexity aperture coupled patch radiators reduce the AIPWB layer count by 50% and remove the WAIM component, without sacrificing antenna RF performance within +/−45 degree elevation scan. The use of low-cost commercial-off-the-shelf MMICs with surface mount integration reduces the cost-per-element of the antenna array by more than a factor of three. The low-cost and reduced complexity multilayer printed wiring board stack-up reduces fabrication costs and opens fabrication to a more diverse supplier base.

The disclosed ring cells are able to send or receive RF signals to and from vehicles and aircraft with an agile electronically-scanning antenna array beam without mechanical moving parts. The antenna elements may be assembled into an antenna array that may be used in a host of applications, such as, for example but without limitation, for radar, sensor, or other applications. The antenna elements provide a high-performance, light-weight, low-profile, and ultra-low-cost solution to meet challenging and evolving mission requirements. Moreover, the disclosed antenna elements are used in the fabrication of integrated and structurally-integrated antennas, specifically in composite sandwich panels due to the minimal use of through-depth vias and connections.

FIG. 1 illustrates a perspective view of a ring cell 100 with an electrically conductive fence 102 ("ring fence" 102), according to some of the disclosed implementations. The ring cell 100 comprises a number of circuit board-based sections. In addition to the electrically conductive fence 102, the ring cell 100 includes a ring patch 104, two electrical feed lines 106 and 108, a ring slot 110, a top dielectric layer 112, a top adhesive layer 114, a foam layer 116, an upper internal adhesive layer 118, an internal metal layer 120, a middle dielectric layer 122, and a bottom dielectric layer 122. In some implementations, the foam layer 116 comprises a foam layer that separates the ring patch 104 from the ring slot 110, and is thus referred to herein as the "foam layer" 116. In some examples, the various dielectric layers 112, 122, and 126 are printed circuit boards (PCBs). Moreover, the ring patch 104 may be formed, etched, or adhered to the foam layer 114 to hold the ring patch 104 in place.

The electrically conductive fence 102 includes one or more metallic (or otherwise conductive) walls. An alternative design shown in FIG. 4 replaces the metallic walls with a circular pattern of electrical vias.

More specifically, the horizontal top section of the ring cell 100 includes the top dielectric layer 112 that supports the ring patch 104 below and also serves as an environmental shield against corrosion. The ring patch 104 includes a cutout hole that reduces the resonance frequency of the patch and allows a smaller outside diameter, which is desirable for mutual coupling reduction and avoidance of over-emphasis of broadside antenna gain.

The bottom section of the ring cell 100 includes two layers of dielectric substrates, the middle dielectric layer 122 and the bottom dielectric layer 126, that collectively support the ring slot 110, dual feed lines 106 and 108, and the thin electrically conductive fence 102. The feed lines 106 and 108 provide electrical supply that excite orthogonal resonant modes in the ring slot 110, which, in turn excites orthogonal resonant modes in the ring patch 104 above for RF signaling. When transmitting RF signals, the electrical feed lines supply the electrical supply (voltage and current) to generate electrical resonance in the ring 110 that, then, generates the desired RF signal in the ring patch 104. When receiving RF signals, the electrical feed lines receive electrical supply induced in the ring 110 from the ring patch 104 receiving an RF signal.

The ring slot 110 and the ring patch 104 work together to provide a wider impedance bandwidth than either one alone could provide. The ring cell 100 is thus designed to operate as a hybrid radiator, working in both transmit and receive modes. Alternatively, the ring cell 100 may operate in just transmit or in just receive mode.

The electrically conductive fence 102 shields the ring slot 110 from an RF power distribution network and reduces unwanted mutual coupling with other ring slots 110 in neighboring ring cells 100 that are part of an array antenna (e.g., a PAA). The diameter and depth of the electrically conductive fence 102 are set so that the ring slot 110 resonates at or near the desired operating frequency band. In some implementations, openings 128 and 130 around the electrically conductive fence 102 allow the feed lines 106 and 108 to go inside without being electrically shorted.

The ring patch 104 and electrically conductive fence 102 are metallic or otherwise electrically conductive. Electricity is supplied to the ring cell 100 through the feed lines 106 and 108, causing the ring fence 102 and ring patch 104 to operate as a radiating element for generating specific RF signals. Shape-wise, the electrically conductive fence 102 has a larger diameter than the ring slot 110. This allows the ring slot 110 to be positioned, horizontally, inside the electrically conductive fence 102. Though, as can be seen in FIG. 2, the ring slot 110 is positioned vertically above the electrically conductive fence 102, at least in some implementations.

Figure 5A:
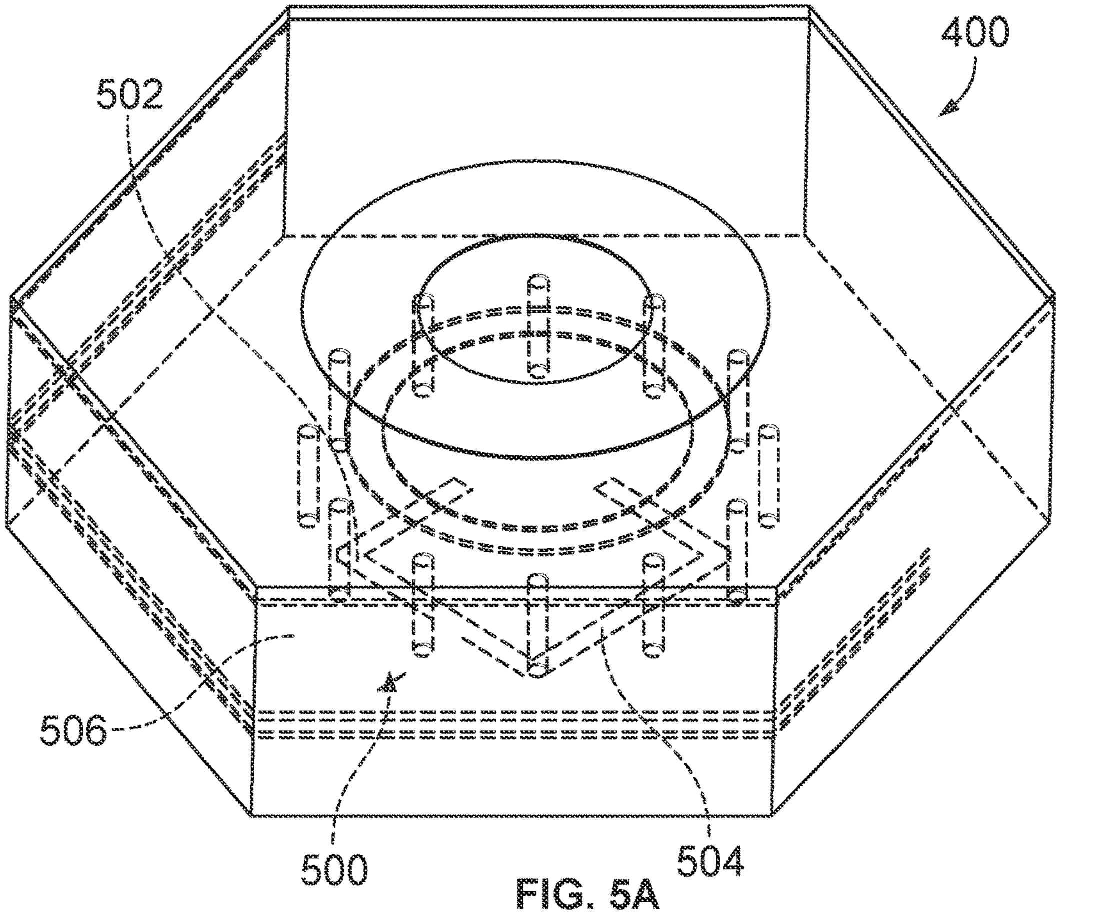
FIGS. 5A and 5B illustrate perspective and top views, respectively, of a ring cell with a T-junction delay feed line, according to some of the disclosed implementations.
Figure 5B:
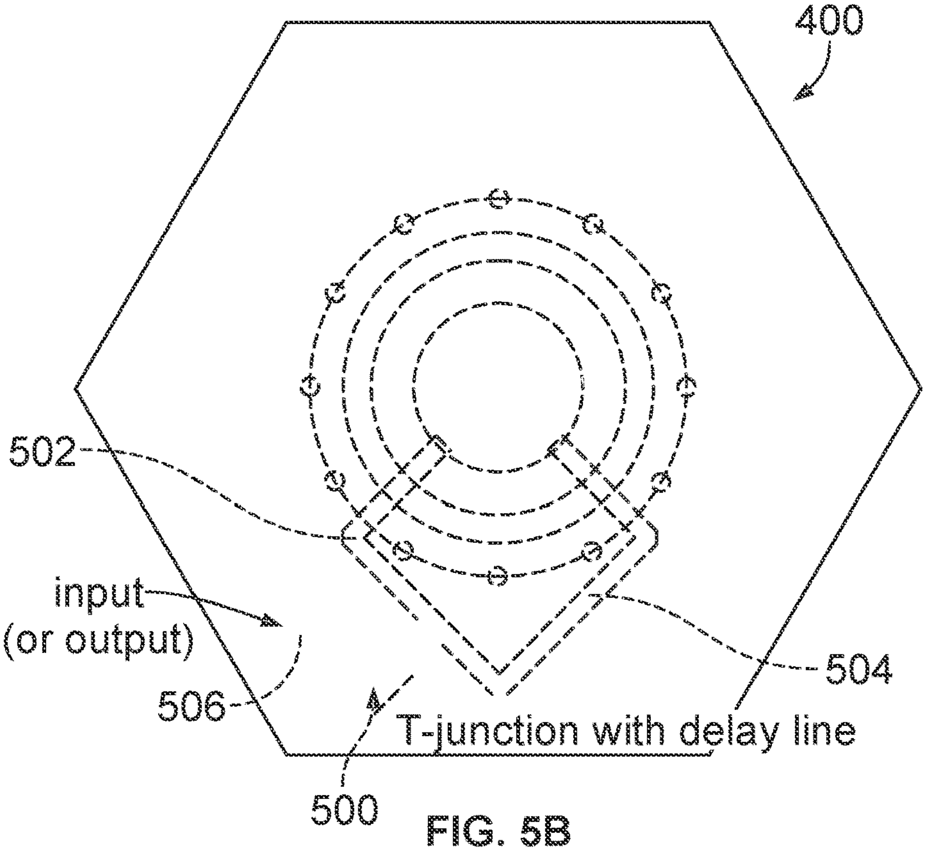
Figure 6A:
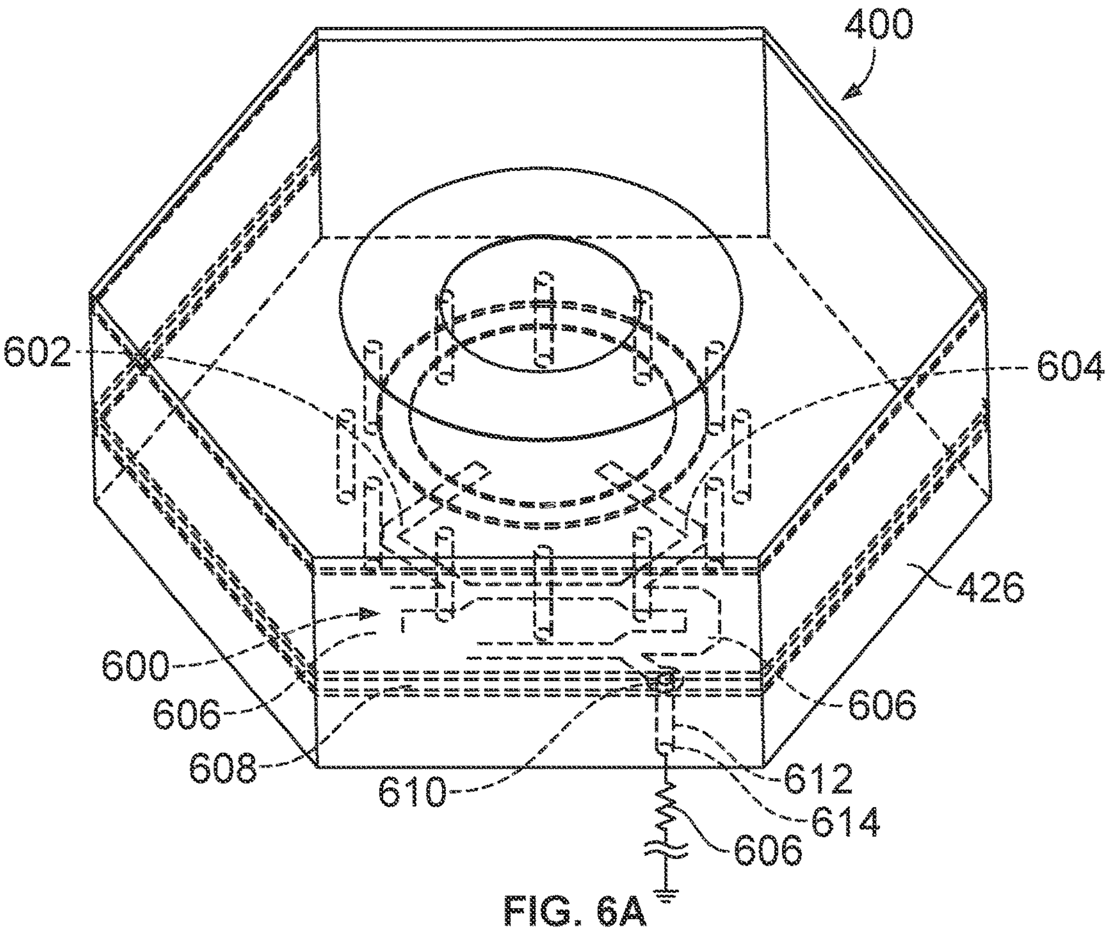
FIGS. 6A and 6B illustrate perspective and top views, respectively, of a ring cell with a 90-degree hybrid coupler, according to some of the disclosed implementations.
Figure 6B:
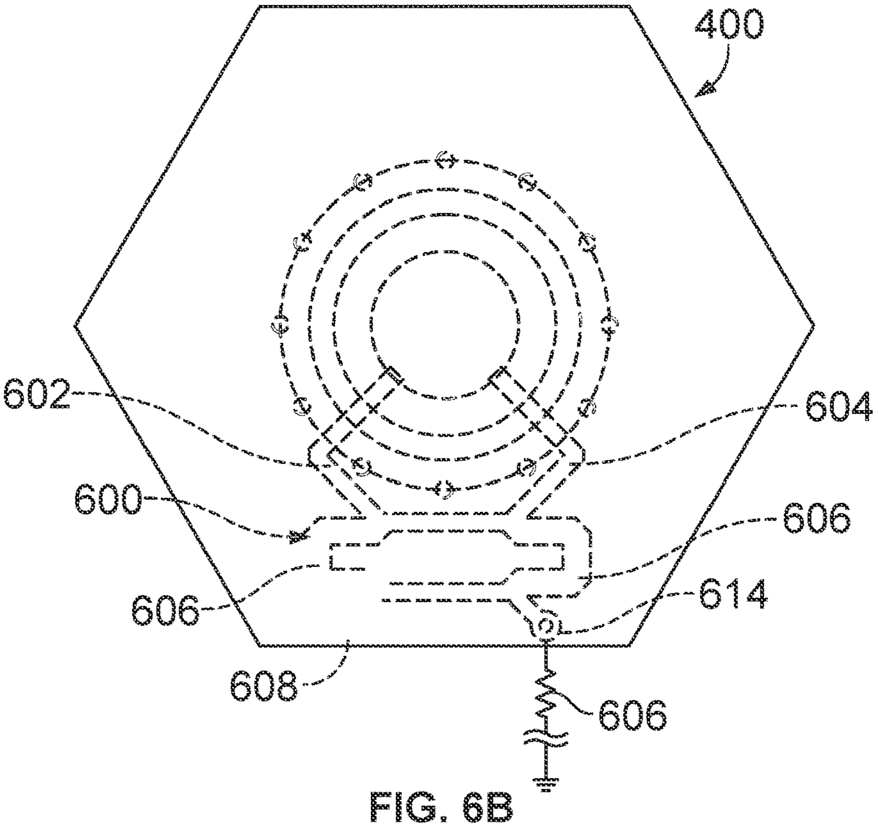

The dual electrical feed lines 106 and 108 excite orthogonal dual-linear polarizations necessary for some applications. For other applications, a dual or single circular polarization may be required. Alternatively, some implementations include a feed structure using a T-junction divider/combiner (transmit/receive, respectively) and a 90-degree delay line for right-hand circular polarization, which is shown in FIGS. 5A and 5B. This integrated co-planar feed provides an economical way to achieve optimal polarization performance in the far-field. Left-hand circular polarization can also be realized by moving the L-shaped input line section from the current position to the other side of the V-shaped junction. For improved circular polarization performance over scan, other implementations use a different feed structure that uses a 90-degree hybrid coupler, which is shown in FIGS. 6A and 6B.

The illustrated ring cells 100 disclosed herein are shaped in a hexagonal pattern. Yet, other shapes are fully contemplated as well. For instance, the ring cell 100 may be circular, rectangular, square, or the like. In these non-hexagonal shaped ring cells 100, some implementations still use a circular ring patch 104, ring slot 110, and electrically conductive fence 102.

Figure 2:
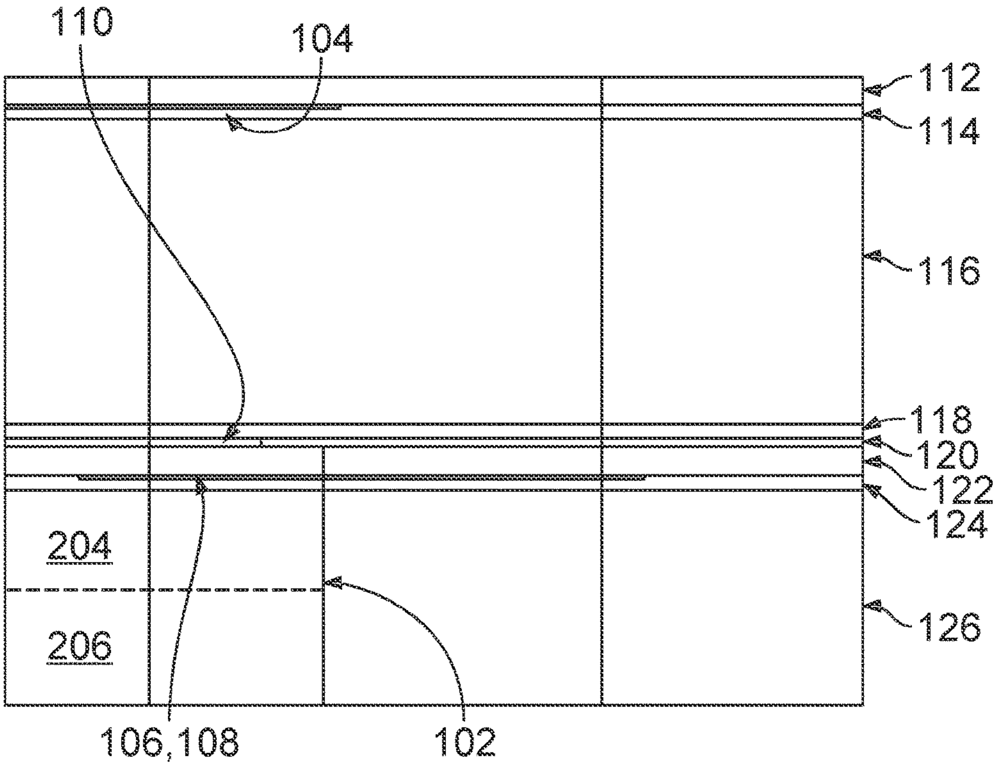
FIG. 2 illustrates a cut-out side view of a ring cell with an electrically conductive fence, according to some of the disclosed implementations.

FIG. 2 illustrates a cut-out side view of the ring cell 100 with the electrically conductive fence 102, according to some of the disclosed implementations. As depicted, the ring patch 104 is positioned atop the top adhesive layer 114 and below the dielectric layer 112. The foam layer 116 separates the top adhesive layer 114 from the ring slot 110. Specifically, the foam layer 116 is positioned between the top adhesive layer 114 and the upper internal adhesive layer 118. The ring slot 110 is situated within the internal metal layer 120. The electrically conductive fence 102 spans across the middle dielectric layer 122, the lower adhesive layer 124, and the bottom dielectric layer 126.

The disclosed example shows the feed lines 106 and 108 being positioned vertically in the upper half of the electrically conductive fence 102. Dotted line 202 shows the vertical middle of the electrically conductive fence 102. As can be seen, the feed lines 106 and 108 are positioned in upper half 204, instead of in lower half 206.

Figure 3:
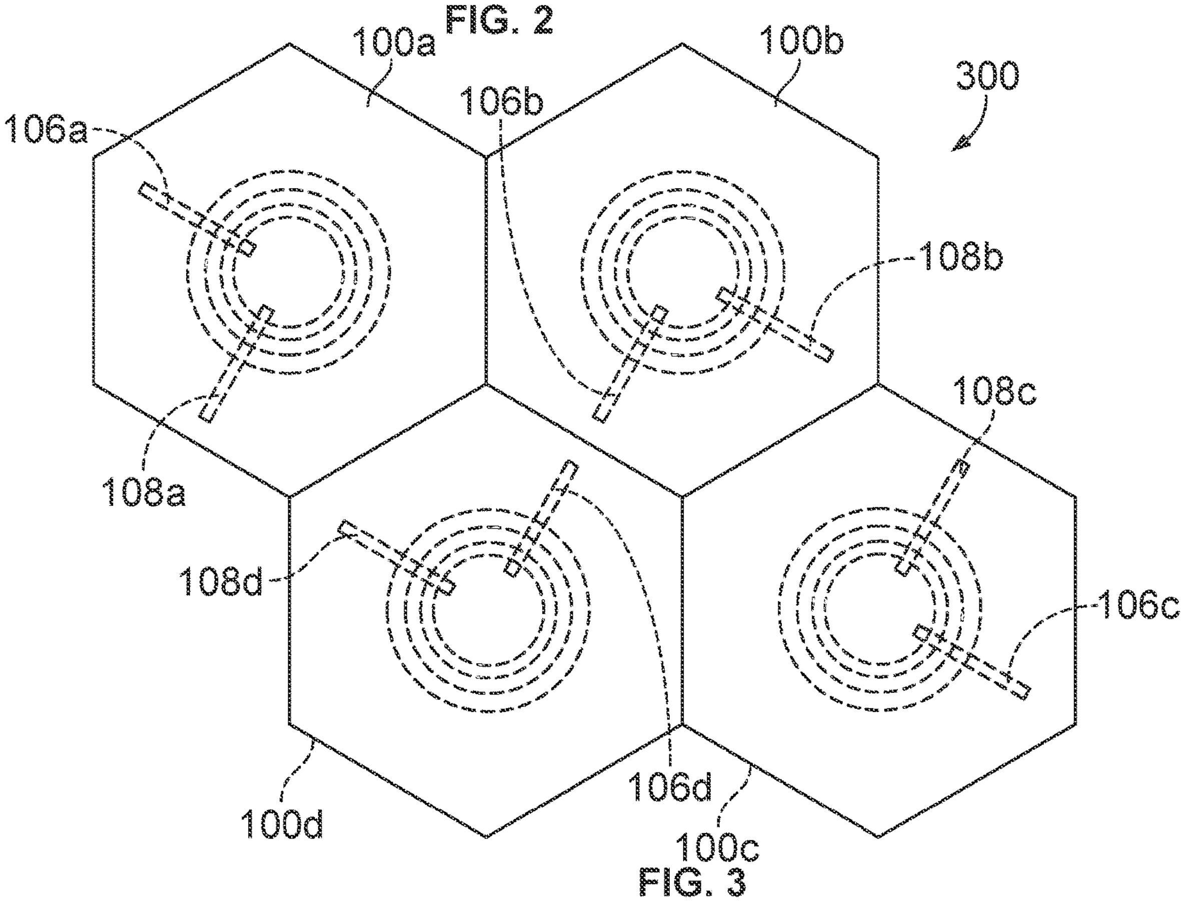
FIG. 3 illustrates a top view of an antenna array made up of multiple ring cells, according to some of the disclosed implementations.

FIG. 3 illustrates a top view of an antenna array 300 made up of multiple ring cells 100*a-d*, according to some of the disclosed implementations. This illustration shows one example where electrical feed lines 106*a-d* and 108*a-d* of the various ring cells 100*a-d* with a 90-degree rotation. In other words, feed lines 106*a* and 108*a* are rotated 90 degrees from the positions of feed lines 106*b* and 108*b*. This positioning suppress undesirable cross-polarization signal level in the far-field.

An alternative design that does not use the electrically conductive fence 102 is shown in FIGS. 4-6B. Instead of an electrically conductive fence, these alternative implementations form a circular fence using a collection of electrical vias.

Figure 4:
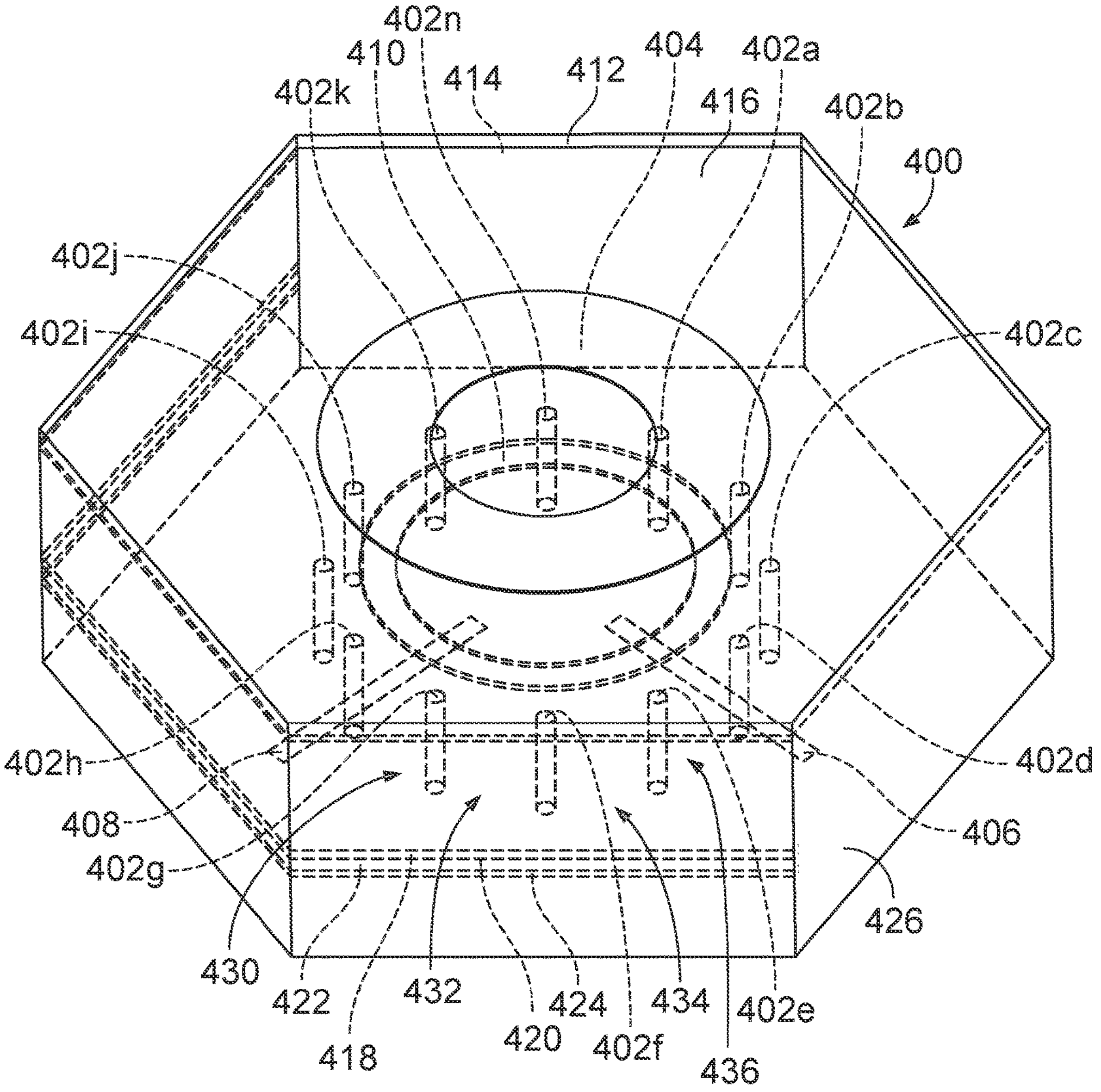
FIG. 4 illustrates a perspective view of a ring cell with a circular via fence, according to some of the disclosed implementations.

Along these lines, FIG. 4 illustrates a perspective view of a ring cell 400 with a circular via fence 402, according to some of the disclosed implementations. The ring cell 400 a ring patch 404, two electrical feed lines 406 and 408, a ring slot 410, a top dielectric layer 412, a top adhesive layer 414, a foam layer 416, an upper internal adhesive layer 418, an internal metal layer 420, a middle dielectric layer 422, and a bottom dielectric layer 422. These various components are positioned in the same manner previously discussed ring cell 100. Yet, instead of the electrically conductive fence 102, the ring cell 400 includes electrical vias 402*a-n* that are positioned in a circular pattern around the ring slot 410, collectively forming a via fence with numerous openings 430-436 (though, only four openings are labeled).

Like the ring cell 100, the horizontal top section of the ring cell 400 includes the top dielectric layer 412 that supports the ring patch 404 below and also serves as an environmental shield against corrosion. The ring patch 404 includes a cutout hole that reduces the resonance frequency of the patch and allows a smaller outside diameter, which is desirable for mutual coupling reduction and avoidance of over-emphasis of broadside antenna gain.

The bottom section of the ring cell 400 includes two layers of dielectric substrates, the middle dielectric layer 422 and the bottom dielectric layer 426, that collectively support the ring slot 410, dual feed lines 406 and 408, and the via fence formed by the electrical vias 402*a-n*. The feed lines 406 and 408 excite orthogonal resonant modes in the ring slot 410, which, in turn excites orthogonal resonant modes in the ring patch 404 above. The ring slot 410 and the ring patch 404 work together to provide a wider impedance bandwidth than either one alone could provide. The ring cell 400 is thus designed to operate as a hybrid radiator, working in both transmit and receive modes. Alternatively, the ring cell 400 may operate in just transmit or in just receive mode.

The ring patch 404 and electrically electrical vias 402*a-n* are metallic or otherwise electrically conductive. Electricity is supplied to the ring cell 400 through the feed lines 406 and 408, causing the electrical vias 402*a-n* and ring patch 404 to operate as a radiating element for generating specific RF signals. Shape-wise, the via fence has a larger diameter than the ring slot 410. This allows the ring slot 410 to be positioned, horizontally, inside the electrically conductive fence 402.

The via fence created by the electrical vias 402*a-n* also shield the ring slot 410 from a power distribution network and reduce unwanted mutual coupling with other ring slots 410 in neighboring ring cells 400 that are part of an array antenna (e.g., a PAA). The diameter and depth of the via fence are set so that the ring slot 410 resonates at or near the desired operating frequency band. In some implementations, the openings around the electrical vias conductive fence 102 allow the feed lines 106 and 108 to go inside without being electrically shorted.

The feed lines 406 and 408 being positioned vertically in the upper half of the electrical vias 402*a-n*.

FIGS. 5A and 5B illustrate perspective and top views, respectively, of the ring cell 400 with a T-junction delay feed line 500, according to some of the disclosed implementations. The T-junction delay feed line 500 includes two feed lines (shorter feed line 502 and longer L-shaped feed line 504) that extend out from a single input/output (I/O) line 506. Feed line 504 is longer than feed line 502 for circular polarization formation in the RF signals emitted or received through the ring cell 400. These separate feed lines 504 and 506 are positioned 90-degrees from each other. While ring cell 400 design with electrical vias 402*a-n* is shown, the T-junction delay feed line 500 may be used in the ring cell 100 with the electrically conductive fence 102.

The depicted T-junction delay feed line 500 provides right-hand circular polarization, supplying optimal polarization in the far-field. Left-hand circular polarization may also be realized by moving the longer L-shaped feed line 504 from the illustrated position to the other side of the V-shaped junction.

The depicted T-junction delay feed line 500 may also be used in the ring cell 100, instead of the depicted ring cell 400. Ring cell 400 is only shown in FIGS. 5A-5B as one example of a ring cell with the T-junction delay feed line 500.

FIGS. 6A and 6B illustrate perspective and top views, respectively, of the ring cell 400 with a 90-degree hybrid coupler 600, according to some of the disclosed implementations. The hybrid coupler 600 includes two feed lines 602 and 604 and an ellipsoidal (or circular) path line 906. In some implementations, feed lines 604 and 606 are positioned 90-degrees from each other. The hybrid coupler 600 includes two terminal ends 608 and 610. End 608 acts as an input or output of voltage supply, depending on whether the ring cell is transmitting or receiving RF signals. End 610 is connected to an electrical via 612 that spans through the bottom dielectric layer 426 and is electrically coupled to a resistor 614. In operation, this hybrid coupler 600 provides improved circular polarization performance.

The depicted hybrid coupler 600 may also be used in the ring cell 100, instead of the depicted ring cell 400. Ring cell 400 is only shown in FIGS. 6A-6B as one example of a ring cell with the hybrid coupler 600.

Figure 7:
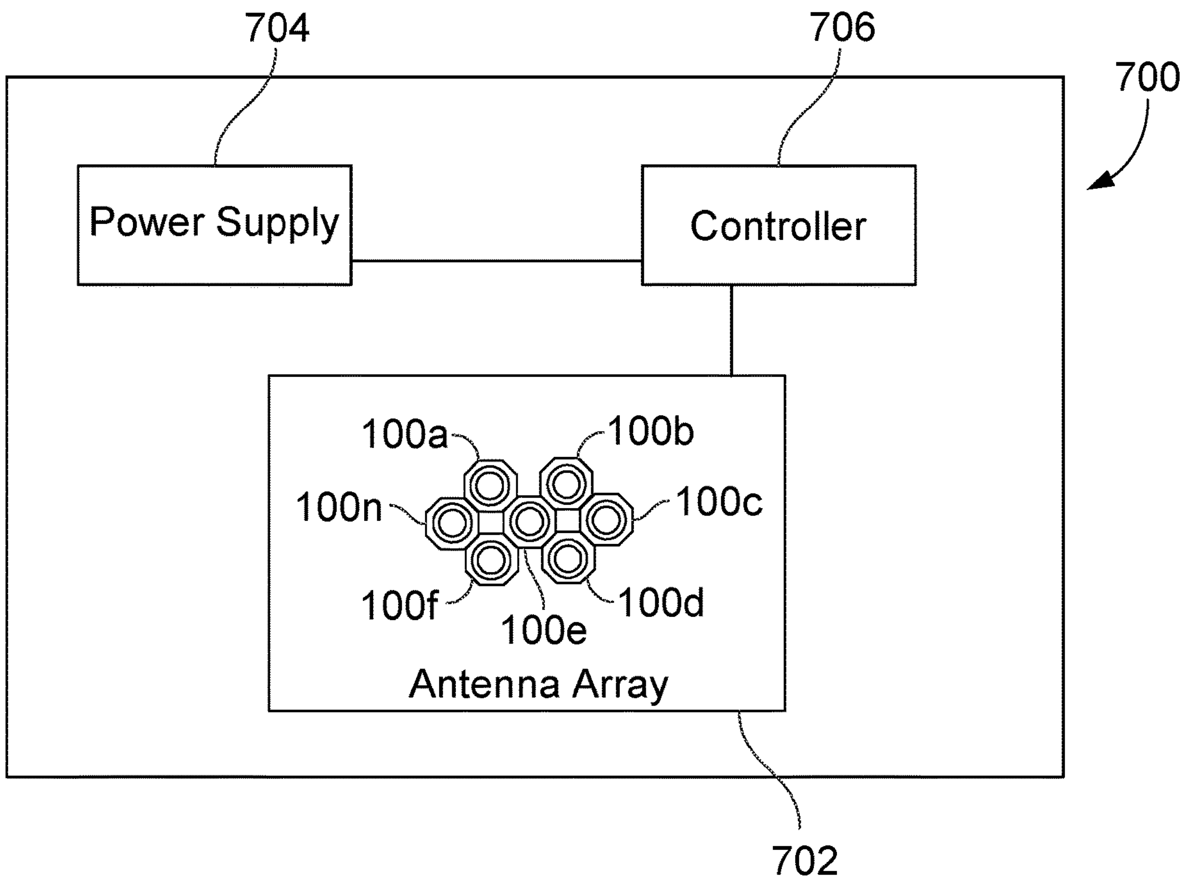
FIG. 7 illustrates a block diagram of an antenna system for an antenna array made up of the disclosed ring cells in this disclosure.

FIG. 7 illustrates a block diagram of an antenna system 700 for an antenna array 702 made up of the disclosed ring cells 100*a-n* in this disclosure. In this example, the antenna system 700 includes a power supply 702, a controller 704, and the antenna array 702. In this example, the antenna array 702 is a phased array antenna ("PAA") that includes a plurality of the ring cells 102*a-n* that operate either transmit and/or receive modules. Ring cells 100*a-n* include corresponding radiation elements that in combination are capable of transmitting and/or receiving RF signals. For example, the ring cells 100*a-n* may be configured to operate within a K-band frequency range (e.g., about 20 GHz to 40 GHz for NATO K-band and 18 GHz to 26.5 GHz for IEEE K-band).

The power supply 704 is a device, component, and/or module that provides power to the controller 706 in the antenna system 700. The controller 706 is a device, component, and/or module that controls the operation of the antenna array 702. The controller 706 may be a processor, microprocessor, microcontroller, digital signal processor ("DSP"), or other type of device that may either be programmed in hardware and/or software. The controller 706 controls the electrical feed supplies provided to the antenna array 702, including, without limitation calibrating particular polarization, voltage, frequency, and the like of the electrical feeds. Only one line is shown between the controller 706 and the antenna array 702 for the sake of clarity, but in reality, several electrical connections and supply lines may connect the controller 706 to the antenna array 702.

In some implementations, the controller 706 supplies the particular electrical feeds to the various ring cells 100*a-n* in order to create numerous RF signals that combine, either constructively or destructively, to form a desired cumulative RF signal for transmission.

RF signals emitted from each ring cell 100*a-n* in the array antenna 702 may be in phase so as to constructively produce intense radiation or out of phase to destructively create a particular RF signal. Direction may be controlled by setting the phase shift between the signals sent to different ring cells 100*a-n*. The phase shift may be controlled by the controller 706 placing a slight time delay between signals sent to successive ring cells 100*a-n* in the array.

The antenna system 700 is described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

This antenna system 700 provides a means to send (or receive) RF signals to (or from) airborne/mobile vehicles with an agile electronically scanning antenna array beam without mechanical moving parts. The antenna system 700 can be used in communications systems and other applications, including, without limitation, for radar/sensor, electronic warfare, military applications, mobile communications, and the like. The antenna system 700 provides a high-performance, light-weight, low-profile and affordable solution to meet challenging and evolving mission requirements.

Figure 8:
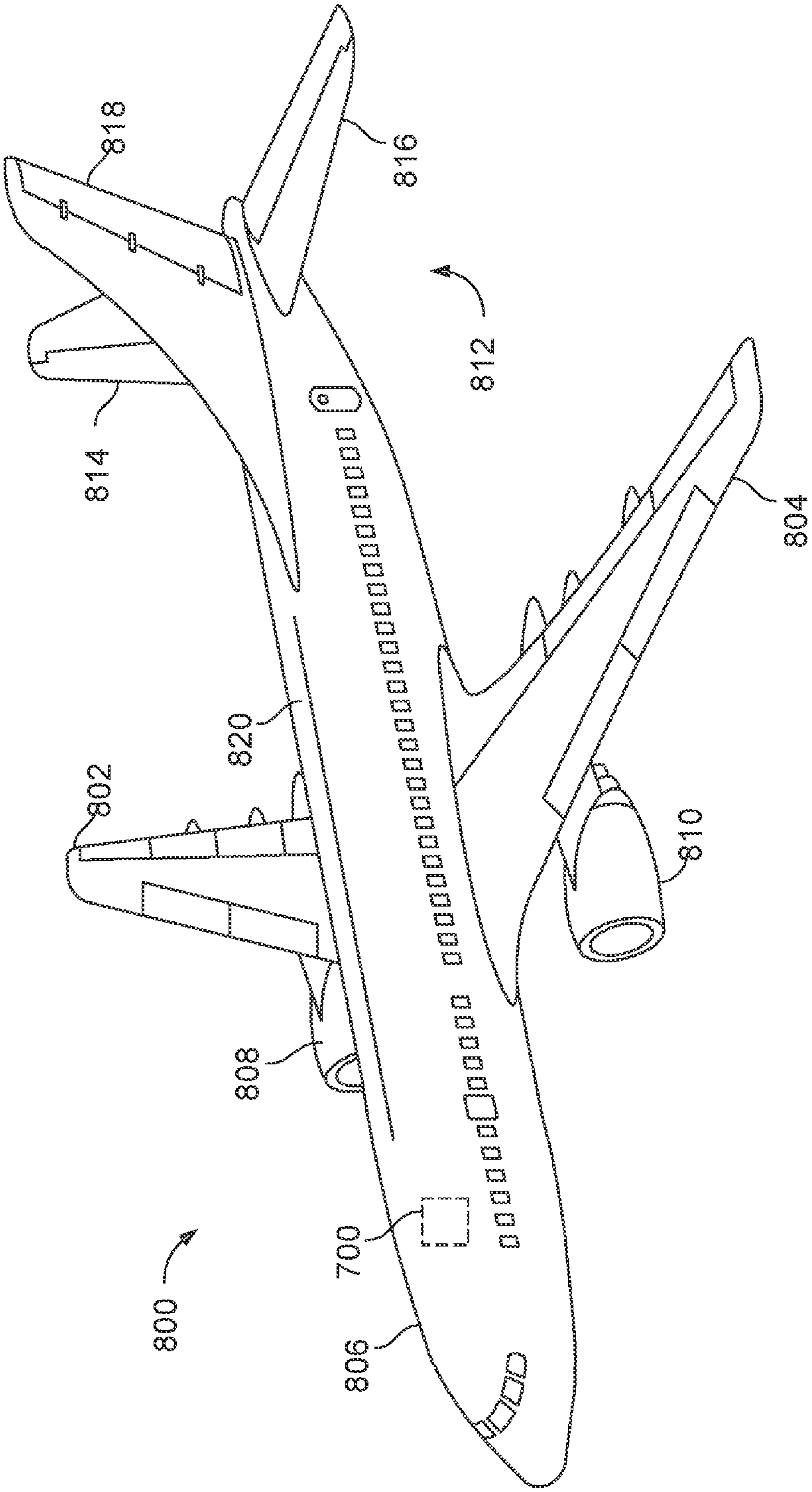
FIG. 8 illustrates a perspective view of an aircraft having one or more array antennas made up of the disclosed ring cells in this disclosure.

FIG. 8 illustrates a perspective view of an aircraft having an antenna array 702 according to various implementations of the present disclosure. The aircraft 800 includes a wing 802 and a wing 804 attached to a body 806. The aircraft 800 also includes an engine 808 attached to the wing 802 and an engine 810 attached to the wing 804. The body 806 has a tail section 812 with a horizontal stabilizer 814, a horizontal stabilizer 816, and a vertical stabilizer 818 attached to the tail section 812 of the body 806. The body 806 in some examples has a composite skin 820.

In some examples, the previously discussed antenna system 700, which includes the disclosed ring cells 100 in an antenna array 702 or just the ring cells 100 individually, may be included onto or in the aircraft 800. This is shown in FIG. 8 with a dotted box. The antenna system 700 may be positioned inside or outside of the aircraft 700.

The illustration of the aircraft 800 is not meant to imply physical or architectural limitations to the manner in which an illustrative configuration may be implemented. For example, although the aircraft 800 is a commercial aircraft, the aircraft 800 can be a military aircraft, a rotorcraft, a helicopter, an unmanned aerial vehicle, or any other suitable aircraft. Other vehicles are possible as well, such as, for example but without limitation, an automobile, a motorcycle, a bus, a boat, a train, or the like.

Traditionally, ceramic chip carrier modules are used to interface MMICs with an AIPWB. Such ceramic packages are relatively expensive and require costly manual labor to assemble. Not only that, but the ceramic packages also use bulky and complex waveguide radiators that add lamination steps and extra layers to the AIPWB. The waveguide radiators require a costly and complex wide angle impedance matching (WAIM) structure as an interface between the antenna array and free space. Unfortunately, this does not meet the cost per element targets for many line-of-sight communication customers.

The disclosed implementations and examples use low-complexity aperture coupled patch radiators, low cost commercial-off-the-shelf surface mount MMICs, and a low cost multilayer printed wiring board stack-up. The low-complexity aperture coupled patch radiators reduce the AIPWB layer count by 50% and remove the WAIM component, without sacrificing antenna RF performance within +/−45 degree elevation scan. The use of low-cost commercial-off-the-shelf MMICs with surface mount integration reduces the cost-per-element of the antenna array by more than a factor of three. The low-cost and reduced complexity multilayer printed wiring board stack-up reduces fabrication costs and opens fabrication to a more diverse supplier base.

The disclosed ring cells are able to send or receive RF signals to and from vehicles and aircraft with an agile electronically-scanning antenna array beam without mechanical moving parts. The antenna elements may be assembled into an antenna array that may be used in a host of applications, such as, for example but without limitation, for radar, sensor, or other applications. The antenna elements provide a high-performance, light-weight, low-profile, and ultra-low-cost solution to meet challenging and evolving mission requirements. Moreover, the disclosed antenna elements are used in the fabrication of integrated and structurally-integrated antennas, specifically in composite sandwich panels due to the minimal use of through-depth vias and connections.

Figure 9:
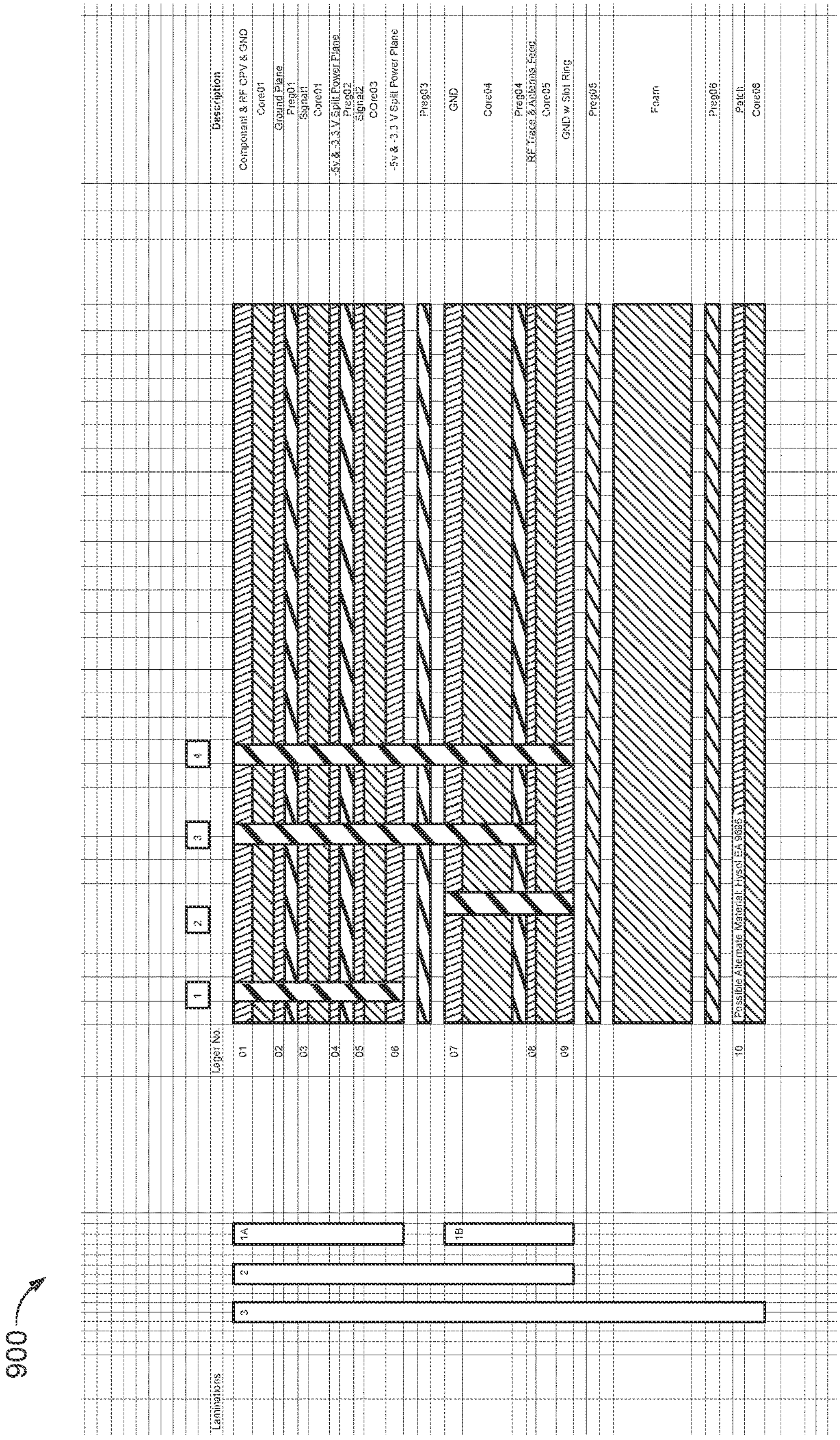
FIG. 9 illustrates an antenna integrated printed wiring board (AIPWB) for an antenna array that is built with several ring cells, according to some of the disclosed implementations.
Figure 10:
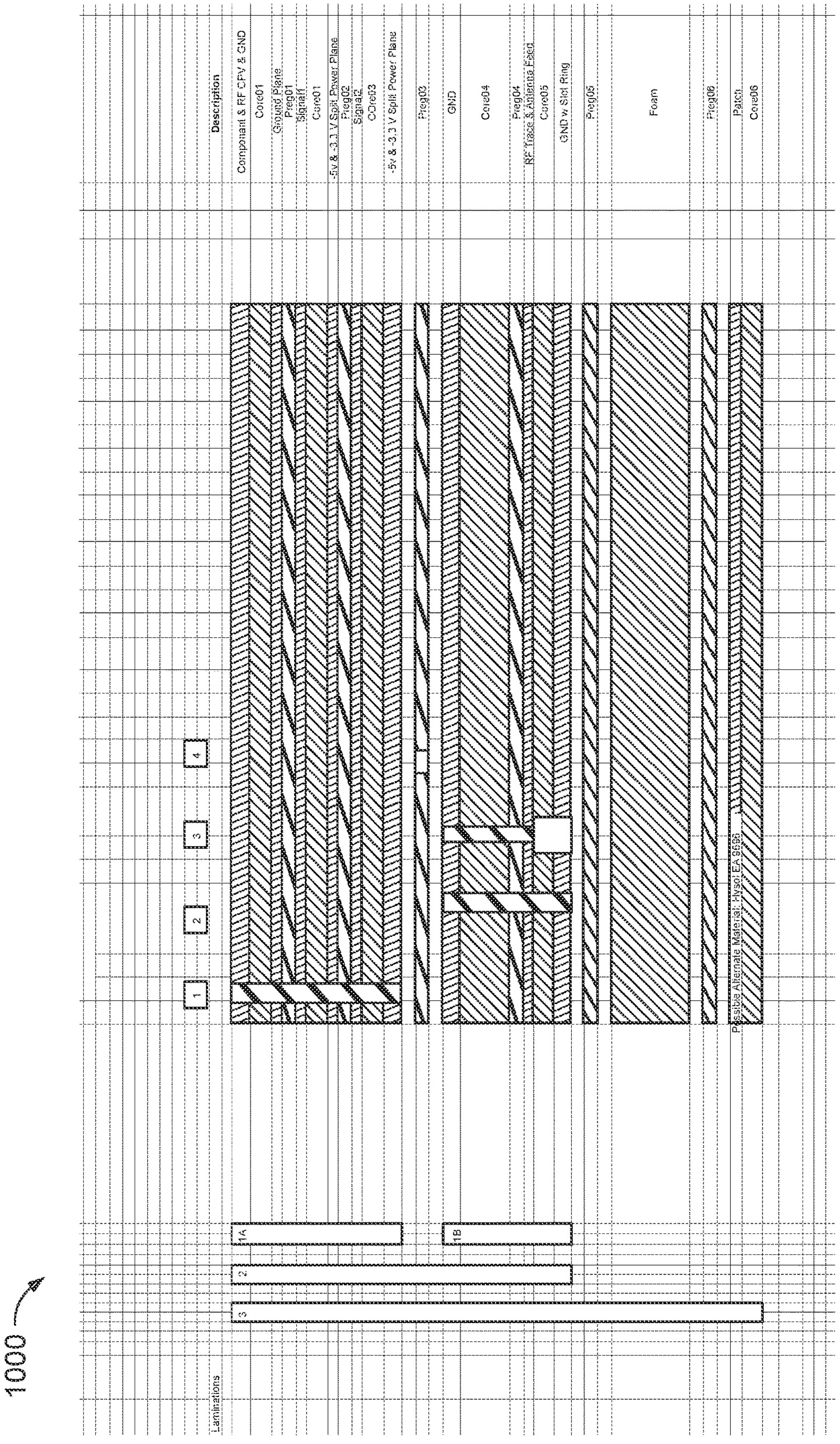
FIG. 10 illustrates another AIPWB for an antenna array that is built with several ring cells, according to some of the disclosed implementations.

FIG. 9 illustrates an AIPWB 900 for the antenna array 702 that is built with several ring cells 100, according to some of the disclosed implementations. AIPWB 900 includes nine vias (1-9) and various laminations (1, 2, 3), one of which is split into two separate sub-laminations (1A and 1B). Sub-lamination 1A includes layers 1 to 6 and provides control and power routing for MMICs using a single drill step as well as RF interconnects on layer 1. Sub-lamination 1B covers layers 7 to 9 and is an RF a-symmetric stripline, which provides RF distribution across the antenna array 702 to quad (or other multiplier)-element beamforming MMICs as well as feed structures to the aperture couple patches. The sub-lamination 1B has one drill step for the RF suppression vias used for isolation between radiating structures and the RF distributing network. Lamination 2 may be implemented with a coast-to-coast layer 1-to-layer 9 via as shown in FIG. 9, or the electrical join of sub-laminations 1A and 1B can be accomplished with an Ormet paste process as shown in FIG. 10. Lamination 3 connects the entire PCB structure with a foam spacer (e.g., foam layer 116) and electrically-isolated radiating patches on layer 10.

FIG. 10 illustrates another AIPWB 1000 for the antenna array 702 that is built with several ring cells 100, according to some of the disclosed implementations. AIPWB 1000 is an aperture-coupled patch antenna array element that requires no vertical interconnects between radiating layers while still suppressing surface modes across the array and limiting mutual coupling. AIPWB 1000 dramatically reduced PCB complexity over conventional line-of-sight (LOS) radiator designs. The new aperture coupled patch antenna array element supports a grating lobe free scan volume of +/−45 degrees in elevation over all azimuth angles without any scan blindness. Using the AIPWB 1000, the antenna array 702 may be pushed to scan beyond 45 degrees; however, steeper gain roll-off is expected when operating in these scan regions.

In some implementations, the antenna array 702 uses a mature and full-featured commercial-off-the-shelf half-duplex phased-array chipset. Such chipset, in some examples, is operational from 8-16 GHz. In some implementations, the chipset consists of two land grid array (LGA) MMICs: a quad-element SiGe beamformer and a RF frontend IC consisting of a low-noise amplifier (LNA) with a single pole double throw (SPTD) switch.

Figure 11:
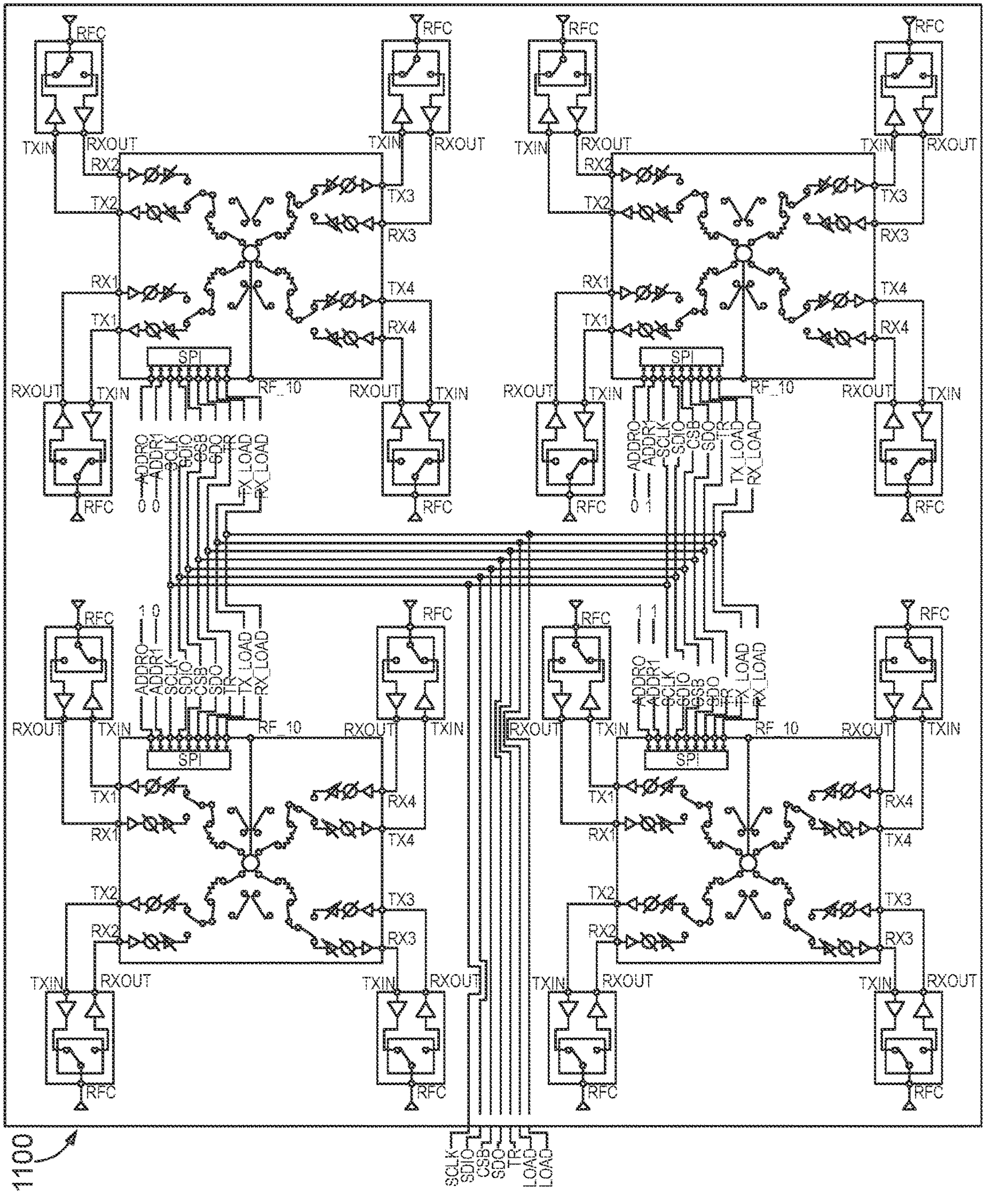
FIG. 11 illustrates a schematic diagram of a sixteen-ring cell subarray using one type of beamformer and frontend integrated circuit (IC), according to some of the disclosed implementations.
Figure 12:
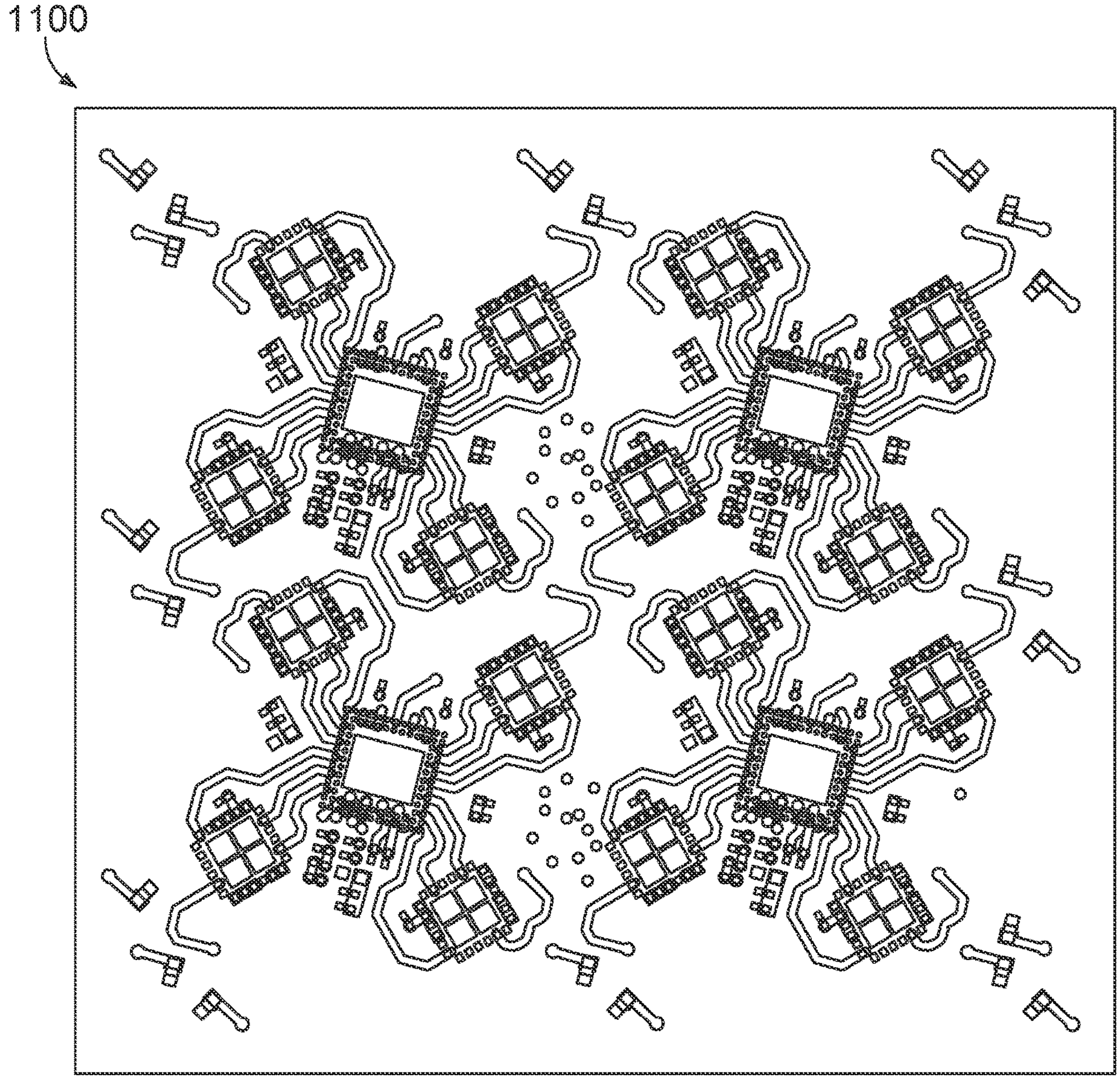
FIG. 12 illustrates a Layer 1 of an interface for MMICs for the sixteen-ring cell subarray antenna 1100.

FIG. 11 illustrates a schematic diagram of a conventional sixteen-ring cell subarray antenna 1100 using one type of beamformer and frontend integrated circuit (IC), according to some implementations. A quad element beamformer is shown, but any beamformer may be used. The sixteen-ring cell subarray antenna 1100 multiple antenna arrays 702 that have various ring cells 100/400. A single four-wire serial peripheral interface (SPI) bus controls the 16-element subarray. In some implementations, these sixteen-ring cell subarray antenna 1100*s* are tiled together in a PCB panel to produce any 16n element array where n is an integer greater than 1. The sixteen-ring cell subarray antenna 1100 is MMIC agnostic and can be easily altered to fit a different commercial-off-the-shelf MMIC chipset.

Figure 13:
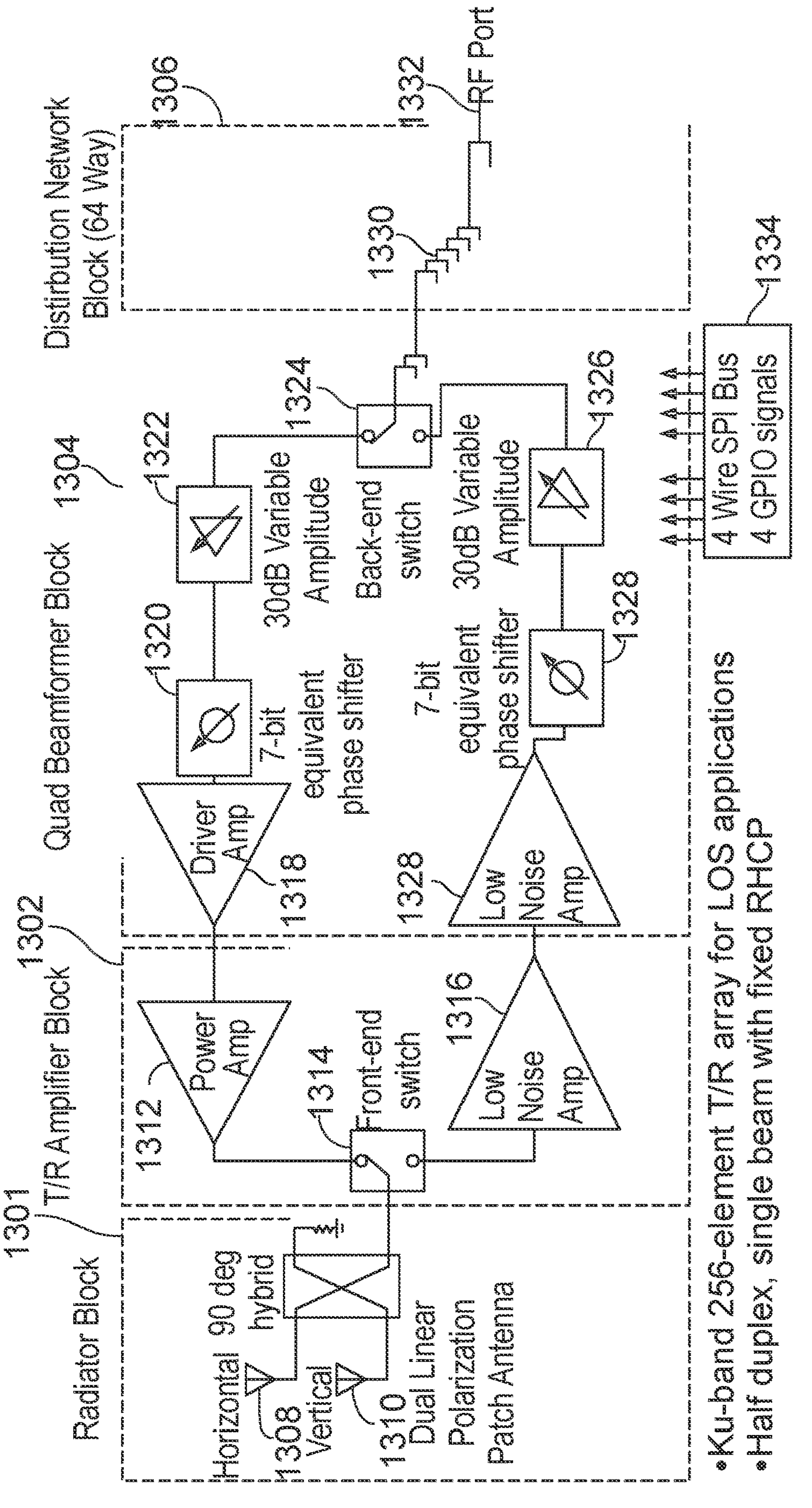
FIG. 13 illustrates a block diagram of a transmit/receive antenna array for line-of-sight applications, according to some of the disclosed implementations.

FIG. 13 illustrates a block diagram of a transmit/receive antenna array 1300 for LOS applications, according to some of the disclosed implementations. In some implementations, the antenna array 1400 functions as a 256-element transmit/receive half-duplex antenna, operating in transmit or receive mode for half the time. Specifically, the antenna array 1300 includes a radiator block 1301, a transmit/receiver (T/R) amplifier block 1302, a beamformer block 1304, and a distribution network block 1306. The radiator block 1301 includes a dual-linear polarization patch antenna with two perpendicularly placed antenna elements: horizontal element 1308 and vertical element 1310. The T/R amplifier block 1302 includes a power amplifier 1312, a front-end switch 1314, and a low-noise amplifier 1316. The beamformer block 1304 includes a driver amplifier 1318, seven-bit equivalent (or other) phase shifters 1320 and 1328, variable operational amplifiers (op amps) 1322 and 1326, a backed-end switch 1324, and a low-noise amplifier 1328. The beamformer block 1304 may take the form of a dual, quad, or other multiple element beamformer. The distribution block 1406 includes a splitter 1330 and an RF port 1332, the latter for receiving an RF input for transmission or directing a received RF input that has been received.

The front-end switch 1314 and the back-end switch 1324 are controlled to selectively configure the antenna array 1400 in transmit or receive modes. The depicted example shows the antenna array 1400 in transmit mode. Alternatively, front-end switch 1314 and the back-end switch 1324 may both be switched to their other throws for receive mode.

When operating in the transmit mode, the RF input 1432 is received and broken into 64 different ways by splitter 1330. This 64-way broken signal is passed through the back-end switch 1324 to the op amp 1322, phase shifter 1320, and power amplifier 1312 before being supplied through the front-end switch 1314 to the radiator block 1301 where the RF signal is transmitted.

When operating in the receive mode, an RF input is received at the radiator block 1301. This received RF signal is passed through the front-end switch 1314 to the low-noise amplifiers 1316 and 1328, the phase shifter 1328, and the power amplifier 1326. The amplified RF signal is then provide through the back-end switch 1320, through the splitter 1330, and out the RF port 1332.

The following clauses describe further aspects of the present disclosure. In some implementations, the clauses described below can be further combined in any subcombination without departing from the scope of the present disclosure.

Clause Set A:

A1: A system, comprising:

a distribution block configured to receive a radio frequency (RF) signal and split the RF signal a plurality of ways;

a beamformer block configured to receive and amplify the split RF signal; and a radiator block configured to transmit the RF signal.

A2: The system of claim 1, wherein the radiator block comprises at least one ring cell comprising:

a plurality of dielectric layers comprising a top dielectric layer, a middle dielectric layer, and a bottom dielectric layer;

a ring patch positioned in the top dielectric layer;

a foam layer between the top dielectric layer and the middle dielectric layer;

a ring slot position between the foam layer and the middle dielectric layer;

an electrically conductive fence positioned below and supporting the ring slot, the electrically conductive fence spanning through the bottom dielectric layer; and electrical feed lines supplying electrical feed to generate electrical resonance in the ring slot for producing the RF signal in the ring patch.

A3: The system of claim A2, wherein the electrical feed lines are co-planar to the electrically conductive fence in an upper half of the electrically conductive fence toward the top dielectric layer.

A4: The system of claim A2, further comprising a plurality of adhesives that are affixed to the plurality of dielectric layers.

A5: The system of claim A2, wherein the ring patch is positioned below the top dielectric layer and above the foam layer.

A6: The system of claim A2, wherein the foam layer comprises a honeycomb foam.

A7: The system of claim A1, wherein the radiator block comprises at least one ring cell comprising:

a plurality of dielectric layers comprising a top dielectric layer, a middle dielectric layer, and a bottom dielectric layer;

a ring patch positioned in the top dielectric layer;

a foam layer between the top dielectric layer and the middle dielectric layer;

a ring slot position between the foam layer and the middle dielectric layer;

an electrically conductive fence positioned below and supporting the ring slot, the electrically conductive fence spanning through the bottom dielectric layer; and a T-junction delay feed line for supplying electrical feed to generate electrical resonance in the ring slot for producing the RF signal in the ring patch A8: The ring cell of claim A7, wherein the T-junction delay feed line comprises an L-shaped feed line and a second feed line.

A9: The ring cell of claim A8, wherein the L-shaped feed line is longer than the second feed line.

A10: The ring cell of claim A8, wherein the L-shaped feed line and the second feed line extend from a single feed line.

A11: The ring cell of claim 7, wherein the foam layer comprises a honeycomb foam.

A12: The ring cell of claim A7, wherein the ring patch is positioned below the top dielectric layer and above the foam layer.

A13: The ring cell of claim A7, wherein the ring patch is attached to an adhesive layer atop the foam layer.

A14: The system of claim A1, wherein the radiator block comprises at least one ring cell comprising:

a plurality of dielectric layers comprising a top dielectric layer, a middle dielectric layer, and a bottom dielectric layer;

a ring patch positioned in the top dielectric layer;

a foam layer between the top dielectric layer and the middle dielectric layer;

a ring slot position between the foam layer and the middle dielectric layer; and an electrically conductive fence positioned below and supporting the ring slot, the electrically conductive fence spanning through the bottom dielectric layer; and a hybrid coupler for supplying electrical feed to generate electrical resonance in the ring slot for producing the RF signal in the ring patch.

A15: The ring cell of claim A14, wherein the hybrid coupler comprises two feed lines and an ellipsoidal feed path line.

A16: The system of claim A14, wherein the hybrid coupler comprises two feed lines and a circular feed path line.

A17: The system of claim A14, wherein the hybrid coupler comprises an electrical via that extends through the bottom dielectric layer and is electrically coupled to a resistor.

A18: The system of claim A1, wherein the radiator block comprises at least one ring cell comprising:

a plurality of dielectric layers comprising a top dielectric layer, a middle dielectric layer, and a bottom dielectric layer;

a ring patch positioned in the top dielectric layer;

a foam layer between the top dielectric layer and the middle dielectric layer;

a ring slot position between the foam layer and the middle dielectric layer;

electrical vias spanning through the bottom dielectric layer; and electrical feed lines supplying electrical feed to generate electrical resonance in the ring slot for producing the RF signal in the ring patch.

Clause Set B:

B1: A system, comprising:

a distribution block configured to receive a radio frequency (RF) signal and split the RF signal a plurality of ways, the distribution block comprising a splitter for splitting the RF signal;

a beamformer block configured to receive and amplify the split RF signal, the beamformer block comprising a back-end switch to direct the split RF signal to one or more amplifiers and a phase shifter;

a transmit/receive amplifier block comprising a front-end switch for directing the amplified split RF signal to an antenna array of ring cells; and a radiator block comprising the antenna array configured to transmit the RF signal through the ring cells.

B2: The system of claim B1, wherein the radiator block comprises at least one ring cell comprising:

a plurality of dielectric layers comprising a top dielectric layer, a middle dielectric layer, and a bottom dielectric layer;

a ring patch positioned in the top dielectric layer;

a foam layer between the top dielectric layer and the middle dielectric layer;

a ring slot position between the foam layer and the middle dielectric layer;

electrical vias spanning through the bottom dielectric layer; and electrical feed lines supplying electrical feed to generate electrical resonance in the ring slot for producing the RF signal in the ring patch.

B3: The system of claim B1, wherein the radiator block comprises at least one ring cell comprising:

a plurality of dielectric layers comprising a top dielectric layer, a middle dielectric layer, and a bottom dielectric layer;

a ring patch positioned in the top dielectric layer;

a foam layer between the top dielectric layer and the middle dielectric layer;

a ring slot position between the foam layer and the middle dielectric layer;

an electrically conductive fence positioned below and supporting the ring slot, the electrically conductive fence spanning through the bottom dielectric layer; and electrical feed lines supplying electrical feed to generate electrical resonance in the ring slot for producing the RF signal in the ring patch.

Clause Set C:

C1: A system, comprising:

a radiator block configured to receive an RF signal;

a transmit/receive amplifier block comprising a front-end switch for directing the amplified split RF signal from the radiator block to a low-noise amplifier;

a beamformer block configured to receive RF signal from the low-noise amplifier and direct the RF signal to one or more amplifiers, a phase shifter, and then through a back-end switch; and a distribution block configured to receive the RF signal from the back-end switch and direct the RF signal out of an RF port.

C2: The system of claim C1, wherein the radiator block comprises at least one ring cell comprising:

a plurality of dielectric layers comprising a top dielectric layer, a middle dielectric layer, and a bottom dielectric layer;

a ring patch positioned in the top dielectric layer;

a foam layer between the top dielectric layer and the middle dielectric layer;

a ring slot position between the foam layer and the middle dielectric layer;

electrical vias spanning through the bottom dielectric layer; and electrical feed lines supplying electrical feed to generate electrical resonance in the ring slot for producing the RF signal in the ring patch.

C3: The system of claim C1, wherein the radiator block comprises at least one ring cell comprising:

a plurality of dielectric layers comprising a top dielectric layer, a middle dielectric layer, and a bottom dielectric layer;

a ring patch positioned in the top dielectric layer;

a foam layer between the top dielectric layer and the middle dielectric layer;

a ring slot position between the foam layer and the middle dielectric layer;

an electrically conductive fence positioned below and supporting the ring slot, the electrically conductive fence spanning through the bottom dielectric layer; and electrical feed lines supplying electrical feed to generate electrical resonance in the ring slot for producing the RF signal in the ring patch.

C4: The system of claim C1, wherein the beamformer block comprise a quad element beamformer.

C5: The system of claim C1, wherein the beamformer block comprise a dual element beamformer.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one implementation or may relate to several implementations. The implementations are not limited to those that solve any or all of the stated problems or those that have any or all of the stated benefits and advantages. It will further be understood that reference to 'an' item refers to one or more of those items.

The term "comprising" is used in this disclosure to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as an ASIC, SoC, or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. As an illustration, the above-described implementations (and/or aspects thereof) are usable in combination with each other. In addition, many modifications are practicable to adapt a particular situation or material to the teachings of the various implementations of the disclosure without departing from their scope. While the dimensions and types of materials described herein are intended to define the parameters of the various implementations of the disclosure, the implementations are by no means limiting and are exemplary implementations. Many other implementations will be apparent to those of ordinary skill in the art upon reviewing the above description. The scope of the various implementations of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various implementations of the disclosure, including the best mode, and also to enable any person of ordinary skill in the art to practice the various implementations of the disclosure, including making and using any devices or systems and performing any incorporated methods. The patentable scope of the various implementations of the disclosure is defined by the claims, and includes other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

Although the present disclosure has been described with reference to various implementations, various changes and modifications can be made without departing from the scope of the present disclosure.

What is claimed is:

1. A system, comprising:

a distribution block configured to receive a radio frequency (RF) signal and split the RF signal a plurality of ways;

a beamformer block configured to receive and amplify the split RF signal; and a radiator block configured to transmit the RF signal, wherein the radiator block comprises at least one ring cell comprising:

a plurality of dielectric layers comprising a top dielectric layer, a middle dielectric layer, and a bottom dielectric layer;

a ring patch positioned in the top dielectric layer;

a foam layer between the top dielectric layer and the middle dielectric layer;

a ring slot positioned between the foam layer and the middle dielectric layer;

an electrically conductive fence positioned below and supporting the ring slot, the electrically conductive fence spanning through the bottom dielectric layer; and electrical feed lines supplying electrical feed to generate electrical resonance in the ring slot for producing the RF signal in the ring patch.

2. The system of claim 1, wherein the electrical feed lines are co-planar to the electrically conductive fence in an upper half of the electrically conductive fence toward the top dielectric layer.

3. The system of claim 1, further comprising a plurality of adhesives that are affixed to the plurality of dielectric layers.

4. The system of claim 1, wherein the ring patch is positioned below the top dielectric layer and above the foam layer.

5. The system of claim 1, wherein the foam layer comprises a honeycomb foam.

6. The system of claim 1, wherein the radiator block further comprises a T-junction delay feed line for supplying electrical feed.

7. The ring cell of claim 6, wherein the T-junction delay feed line comprises an L-shaped feed line and a second feed line.

8. The ring cell of claim 6, wherein the foam layer comprises a honeycomb foam.

9. The ring cell of claim 6, wherein the ring patch is positioned below the top dielectric layer and above the foam layer.

10. The ring cell of claim 6, wherein the ring patch is attached to an adhesive layer atop the foam layer.

11. The system of claim 1, wherein the radiator block further comprises a hybrid coupler for supplying electrical feed.

12. The system of claim 11, wherein the hybrid coupler comprises two feed lines and an ellipsoidal feed path line.

13. The system of claim 11, wherein the hybrid coupler comprises two feed lines and a circular feed path line.

14. The system of claim 11, wherein the hybrid coupler comprises an electrical via that extends through the bottom dielectric layer and is electrically coupled to a resistor.

15. The system of claim 1, wherein the radiator block further comprises electrical vias spanning through the bottom dielectric layer.

16. A system, comprising:

a distribution block configured to receive a radio frequency (RF) signal and split the RF signal a plurality of ways, the distribution block comprising a splitter for splitting the RF signal;

a beamformer block configured to receive and amplify the split RF signal, the beamformer block comprising a back-end switch to direct the split RF signal to one or more amplifiers and a phase shifter;

a transmit/receive amplifier block comprising a front-end switch for directing the amplified split RF signal to an antenna array of ring cells; and a radiator block comprising the antenna array configured to transmit the RF signal through the ring cells, and wherein the radiator block further comprises at least one ring cell comprising:

a plurality of dielectric layers comprising a top dielectric layer, a middle dielectric layer, and a bottom dielectric layer;

a ring patch positioned in the top dielectric layer;

a foam layer between the top dielectric layer and the middle dielectric layer;

a ring slot positioned between the foam layer and the middle dielectric layer;

an electrically conductive fence positioned below and supporting the ring slot, the electrically conductive fence spanning through the bottom dielectric layer; and electrical feed lines supplying electrical feed to generate electrical resonance in the ring slot for producing the RF signal in the ring patch.

17. The system of claim 16, wherein the radiator block further comprises electrical vias spanning through the bottom dielectric layer.

18. A system, comprising:

a radiator block configured to receive an RF signal;

a transmit/receive amplifier block comprising a front-end switch for directing an amplified split RF signal from the radiator block to a low-noise amplifier;

a beamformer block configured to receive RF signal from the low-noise amplifier and direct the RF signal to one or more amplifiers, a phase shifter, and then through a back-end switch; and a distribution block configured to receive the RF signal from the back-end switch and direct the RF signal out of an RF port, wherein the radiator block comprises at least one ring cell comprising:

a plurality of dielectric layers comprising a top dielectric layer, a middle dielectric layer, and a bottom dielectric layer;

a ring patch positioned in the top dielectric layer;

a foam layer between the top dielectric layer and the middle dielectric layer;

a ring slot position between the foam layer and the middle dielectric layer;

electrical vias spanning through the bottom dielectric layer; and electrical feed lines supplying electrical feed to generate electrical resonance in the ring slot for producing the RF signal in the ring patch.

* * * * *